(12) United States Patent
Schmid et al.

(10) Patent No.: US 10,904,345 B2
(45) Date of Patent: Jan. 26, 2021

(54) SYSTEMS AND METHODS FOR PROVIDING PAGE INFORMATION

(71) Applicant: Facebook, Inc., Menlo Park, CA (US)

(72) Inventors: Matthew Logan Schmid, New York, NY (US); Xiuhui Yu, Menlo Park, CA (US); Allan Grinshtein, Brooklyn, NY (US); Olivier Henri Pascal Devoret, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 610 days.

(21) Appl. No.: 14/951,713

(22) Filed: Nov. 25, 2015

(65) Prior Publication Data
US 2017/0149911 A1 May 25, 2017

(51) Int. Cl.
*H04L 29/08* (2006.01)
*H04L 12/58* (2006.01)
*H04W 4/21* (2018.01)
*H04L 12/26* (2006.01)

(52) U.S. Cl.
CPC .......... *H04L 67/22* (2013.01); *H04L 51/32* (2013.01); *H04W 4/21* (2018.02); *H04L 43/16* (2013.01)

(58) Field of Classification Search
CPC ......... H04L 67/22; H04L 51/32; H04L 43/06; H04L 43/045; H04W 4/21
See application file for complete search history.

(56) References Cited

U.S. PATENT DOCUMENTS

| | | | | |
|---|---|---|---|---|
| 8,712,943 B1* | 4/2014 | Kim | ...................... | G06Q 50/01 706/45 |
| 9,135,558 B1* | 9/2015 | Kim | ...................... | G06Q 50/01 |
| 2001/0032244 A1* | 10/2001 | Neustel | .................. | G06Q 30/02 709/206 |
| 2003/0115203 A1* | 6/2003 | Brown | ................ | G06F 16/9535 |
| 2004/0243679 A1* | 12/2004 | Tyler | .................... | G06Q 10/107 709/206 |
| 2007/0198368 A1* | 8/2007 | Kannan | ............. | G06Q 10/0631 705/26.41 |
| 2008/0005252 A1* | 1/2008 | Della Pasqua | ......... | G06Q 10/10 709/206 |
| 2008/0160490 A1* | 7/2008 | Gomes | ..................... | G09B 7/02 434/350 |
| 2010/0268571 A1* | 10/2010 | Davies | ............ | G06Q 10/06311 705/7.13 |
| 2012/0192050 A1* | 7/2012 | Campbell | .............. | G06Q 50/01 715/212 |
| 2013/0173687 A1* | 7/2013 | Tuchman | ........... | G06Q 30/0601 709/202 |
| 2013/0346496 A1* | 12/2013 | Maarek | .................. | G06Q 10/10 709/204 |

(Continued)

*Primary Examiner* — Philip J Chea
*Assistant Examiner* — Wuji Chen
(74) *Attorney, Agent, or Firm* — Sheppard Mullin Richter & Hampton LLP

(57) ABSTRACT

Systems, methods, and non-transitory computer-readable media can determine responsiveness information for a page in a social networking system, wherein the responsiveness information describes at least a rate at which an administrator of the page replies to messages sent to the page. A request can be received from a user of the social networking system to access the page through a computing device. Data describing the page can be provided to be displayed through the computing device, wherein the responsiveness information is included in the page.

18 Claims, 7 Drawing Sheets

(56) References Cited

U.S. PATENT DOCUMENTS

| | | | |
|---|---|---|---|
| 2014/0046768 A1* | 2/2014 | Hayes | G06Q 30/0267 705/14.64 |
| 2015/0007045 A1* | 1/2015 | Salyers | G06Q 10/10 715/745 |
| 2017/0201850 A1* | 7/2017 | Raleigh | H04M 15/00 |

* cited by examiner

SYSTEMS AND METHODS FOR PROVIDING PAGE INFORMATION

FIELD OF THE INVENTION

The present technology relates to the field of content provision. More particularly, the present technology relates to techniques for providing page information.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, such pages may correspond to businesses or other such entities and users of the social network can navigate to the pages to learn more about the business.

SUMMARY

Various embodiments of the present disclosure can include systems, methods, and non-transitory computer readable media configured to determine responsiveness information for a page in a social networking system, wherein the responsiveness information describes at least a rate at which an administrator of the page replies to messages sent to the page. A request can be received from a user of the social networking system to access the page through a computing device. Data describing the page can be provided to be displayed through the computing device, wherein the responsiveness information is included in the page.

In an embodiment, the systems, methods, and non-transitory computer readable media are configured to determine a response likelihood for the page, the response likelihood measuring what percentage of messages sent to the page over a period of time received a response from the administrator within that same period of time.

In an embodiment, messages sent to the page over the period of time while the page was set to an away mode are excluded from the response likelihood.

In an embodiment, the systems, methods, and non-transitory computer readable media are configured to determine a median response time taken by the administrator to respond to messages sent to the page over a period of time.

In an embodiment, the systems, methods, and non-transitory computer readable media are configured to determine an average response time taken by the administrator to respond to messages sent to the page over a period of time.

In an embodiment, the systems, methods, and non-transitory computer readable media are configured to determine a responsiveness category for the page based at least in part on a response likelihood and a response time determined for the page.

In an embodiment, the systems, methods, and non-transitory computer readable media are configured to determine that the response likelihood for the page over the period of time satisfies a threshold response likelihood and to determine that the response time for the page over the period of time satisfies a threshold response time.

In an embodiment, the systems, methods, and non-transitory computer readable media are configured to assign a visual badge to the page that corresponds to the responsiveness category.

In an embodiment, the visual badge is displayed in the page.

In an embodiment, the visual badge is displayed in a messaging interface through which messages are sent to the page.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
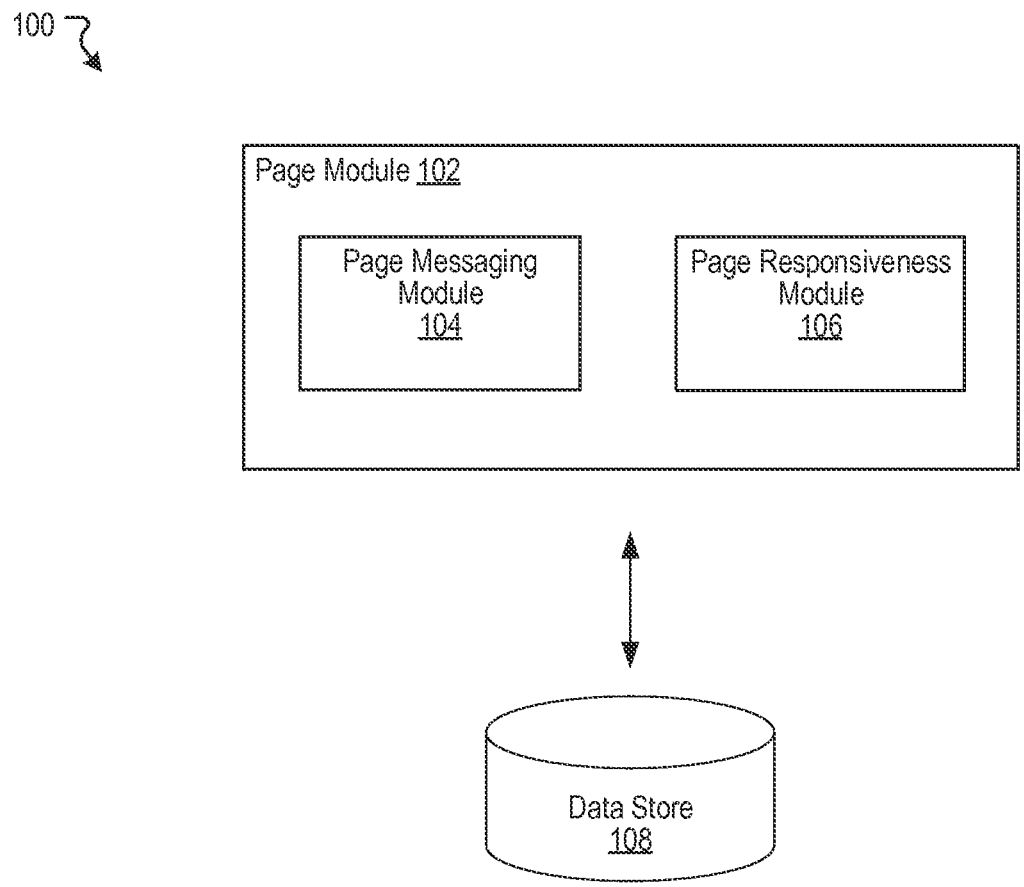
FIG. 1 illustrates an example system including a page module configured to provide access to pages in a social networking system, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Page Information

People often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social networking system for consumption by others. Under conventional approaches, a user may navigate to or be presented with various content items in a social networking system. The content items can come from pages associated with members of the social networking system. In some instances, such pages may correspond to businesses or similar entities and users of the social networking system can navigate to the pages to learn more about the business. Users can send messages to an administrator of the page by interacting with the page or the social networking system, for example. However, not all page administrators may be diligent in responding to messages received from users. In these instances, users typically do not know when, or if, they will receive a response to their message. This uncertainty can cause users to rely less on page messaging features and can, therefore, be detrimental to businesses whose page administrators are generally more responsive to such messages. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a page's responsiveness in replying to messages can be measured. One example responsiveness metric is the page's response rate. Another example metric is the page's response time. In various embodiments, information describing a page's responsiveness can be provided to users of the social networking system, for example, on the page itself or in a messaging interface being used to message the page administrator. By providing such information, users can better gauge how likely they are to receive a response from the page administrator. Further, such visibility can incentivize the page administrator to respond to messages more often and more quickly.

FIG. 1 illustrates an example system 100 including an example page module 102 configured to provide access to pages in a social networking system, according to an embodiment of the present disclosure. As shown in the example of FIG. 1, the example page module 102 can include page messaging module 104 and a page responsiveness module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the page module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the page module 102 can be implemented, in part or in whole, as software running on one or more computing devices or systems, such as on a user or client computing device. In one example, the page module 102 or at least a portion thereof can be implemented as or within an application (e.g., app), a program, or an applet, etc., running on a user computing device or a client computing system, such as the user device 610 of FIG. 6. In another example, the page module 102 or at least a portion thereof can be implemented using one or more computing devices or systems that include one or more servers, such as network servers or cloud servers. In some instances, the page module 102 can, in part or in whole, be implemented within or configured to operate in conjunction with a social networking system (or service), such as the social networking system 630 of FIG. 6.

The page module 102 can be configured to communicate and/or operate with the at least one data store 108, as shown in the example system 100. The at least one data store 108 can be configured to store and maintain various types of data. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. In some embodiments, the at least one data store 108 can store various metrics relating to page responsiveness for various pages available through the social networking system.

The page messaging module 104 can be configured to allow users to communicate with administrators of various pages. In some embodiments, a user can interact with the social networking system through an interface (e.g., a graphical user interface) using, for example, a software application running on a computing device. Through this interface, the user can access various pages that are available through the social networking system. As mentioned, a page can be associated with a user, or member, of the social networking system. Further, such pages may correspond to a business or similar entity. A page for a business can provide users with various information about the business including, for example, a business address, hours of operation, a list of goods and/or services offered by the business, etc. In various embodiments, users can send messages to an administrator of the page, for example, to ask questions or make appointments. In some embodiments, the user can send messages to the page administrator by selecting a "message" option provided on the page. Once a message is sent, the user and the page administrator can then communicate with one another through a messaging interface, for example.

The page responsiveness module 106 can be configured to measure a page's responsiveness in replying to messages that were sent by users. In various embodiments, information describing a page's responsiveness can be provided to users of the social networking system, for example, on the page itself or in a messaging interface being used to send messages the page administrator. More details regarding the page responsiveness module 106 will be provided below with reference to FIG. 2.

Figure 2:
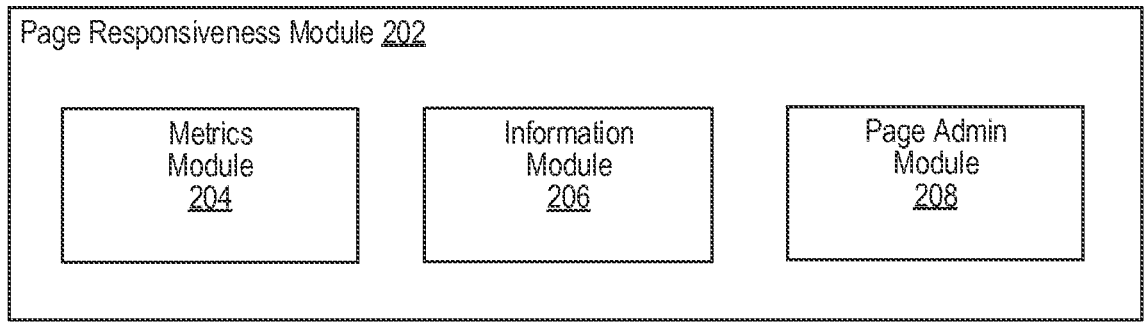
FIG. 2 illustrates an example page responsiveness module configured to determine and provide various response metrics for pages, according to an embodiment of the present disclosure.

FIG. 2 illustrates an example page responsiveness module 202 configured to determine and provide various response metrics for pages, according to an embodiment of the present disclosure. In some embodiments, the page responsiveness module 106 of FIG. 1 can be implemented as the example page responsiveness module 202. As shown in FIG. 2, the example page responsiveness module 202 can include a metrics module 204, an information module 206, and a page admin module 208.

The metrics module 204 can be configured to measure a page's responsiveness in replying to messages that were sent by users using one or more metrics. In one example, the metrics module 204 measures a page's responsiveness by determining a response rate, or likelihood, for the page. In some embodiments, the response rate is determined by measuring what percentage of messages sent to an administrator of the page during a period of time (e.g., 24 hour period) received a response from a page administrator within that same period of time. The period of time during which the response rate is determined can naturally vary depending on the implementation. For example, such period of time may be defined using an interval based on a number of hours, days, weeks, months, years, or any arbitrarily defined interval. In some embodiments, the response rate is determined by measuring what percentage of messages sent to an administrator of the page during a period of time (e.g., 24 hour period) received a satisfactory response from a page administrator within that same period of time. A satisfactory response may be one that satisfies a user's inquiry, for example. In one example, a user may message an administrator of a page to schedule a dental appointment. In this example, the administrator may reply with a message informing the user that the administrator will follow up with a confirmation. In such instances, while the administrator has responded to the user's message, the user's request for a dental appointment is yet to be satisfied. In such embodiments, messages sent by the administrator are not counted in the responsiveness metric until a message satisfying the user's inquiry is sent. Various approaches can be utilized to indicate that the user's inquiry has been satisfied by an administrator's message including, for example, various approaches for obtaining user feedback, an indication by an administrator of the page, or a ticketing system, to name some examples.

In another example, the metrics module 204 measures a page's responsiveness by determining a response time for the page. In some embodiments, the response time is determined by the median amount of time taken by the page administrator to respond to messages received from users over some period of time. In some embodiments, the response time is determined by averaging the amount of time taken by the page administrator to respond to messages received from users over some period of time. In some embodiments, the response time can be determined by evaluating the page administrator's response time with respect to a number of messages irrespective of when those messages were received.

The responsiveness metrics determined for the page may be used to categorize the page into a responsiveness category. For example, a page can be categorized as an "unresponsive" page if the page administrator responds to less than a threshold percentage (e.g., 90 percent) of messages that are received over some period of time. In another example, a page can be categorized as a "responsive" page if the page administrator responds to at least a threshold percentage (e.g., 90 percent) of messages that are received over some period of time. In some embodiments, the responsiveness of a page is determined based on a combination of the page's response rate and response time. In such embodiments, a page can be categorized as "very responsive" page if the page administrator responds to at least a threshold percentage (e.g., 90 percent) of messages that are received over some period of time within a threshold response time (e.g., 5 minutes or less). In various embodiments, a page's responsiveness is determined on a rolling basis over specified periods of time (e.g., 24 hour intervals). Thus, a page's responsiveness categorization can vary depending on the page's responsiveness during a given period of time.

The information module 206 can be configured to provide information describing a page's responsiveness. In some embodiments, the information provided by the information module 206 can vary in terms of detail depending on the audience viewing such information. For example, a page administrator can be provided with more detailed information about the page's responsiveness metrics while users accessing the page can be limited to fewer details. In one example, when accessed by a user, a page can indicate the page's responsiveness category (e.g., "unresponsive", "responsive", or "very responsive"). In some embodiments, such information can be provided to a user in a messaging interface through which the user is sending a message to an administrator of the page. In contrast, when the page is accessed by an administrator of the page, the page can indicate specific responsiveness metrics (e.g., "90 percent of messages responded to within 5 minutes") in addition to the page's responsiveness categorization. In some embodiments, a page that is determined to be "very responsive" can be provided with a badge, or icon, signifying that the page satisfies one or more responsiveness metrics. This badge can be presented in the page itself or in a messaging interface being used by a user to message an administrator of the page, for example.

In some embodiments, the responsiveness metrics determined for a page are not affected when an away mode is set. In one example, an administrator of a page can interact with the social networking system to activate the away mode, for example, by selecting an "away" option through an interface. Once activated, the away mode can be set for a predefined or specified set of time (e.g., 12 hours). In this example, the responsiveness metrics for the page will not be affected by any messages that are received or responded to while the away mode is set. The away mode can automatically expire once the predefined or specified set of time ends. In another example, the away mode may be set automatically based on hours of operation, or business hours, that are associated with the page. For example, the page may correspond to a barber shop that operates daily from 9 am to 7 pm. In this example, the away mode can automatically be triggered outside of the barber shop's hours of operation. As mentioned, the responsiveness metrics for the page will not be affected by any messages that are received or responded to while the away mode is set.

The page admin module 208 can be configured to provide administrators of a page with various options relating to page responsiveness. For example, in some embodiments, an administrator of a page can specify an estimated response time (e.g., within minutes, within a day, within 10 minutes, etc.) and this estimated response time can be presented to users in the page or in a messaging interface through which users can communicate with administrators of the page. In some embodiments, an administrator of a page can define an away message that can be presented to users in the page or provided in a messaging interface when the away mode is set. The away message can be customized to include various information, such as the first and/or last name of the user that messaged an administrator of the page, the first and/or last name of an administrator of the page, specified Uniform Resource Locators (URLs), and/or hours of operation associated with the page. In some embodiments, an administrator of a page can specify an instant reply that is to be sent as soon as a user sends a message to an administrator of the page. For example, the instant reply can acknowledge that the user's message was received and that a response will be sent within some specified time. Such instant replies can be sent automatically in response to user messages that are received during business hours (i.e., when the away mode is not set). The responsiveness metrics determined for a page are not affected by such instant replies.

Figure 3:
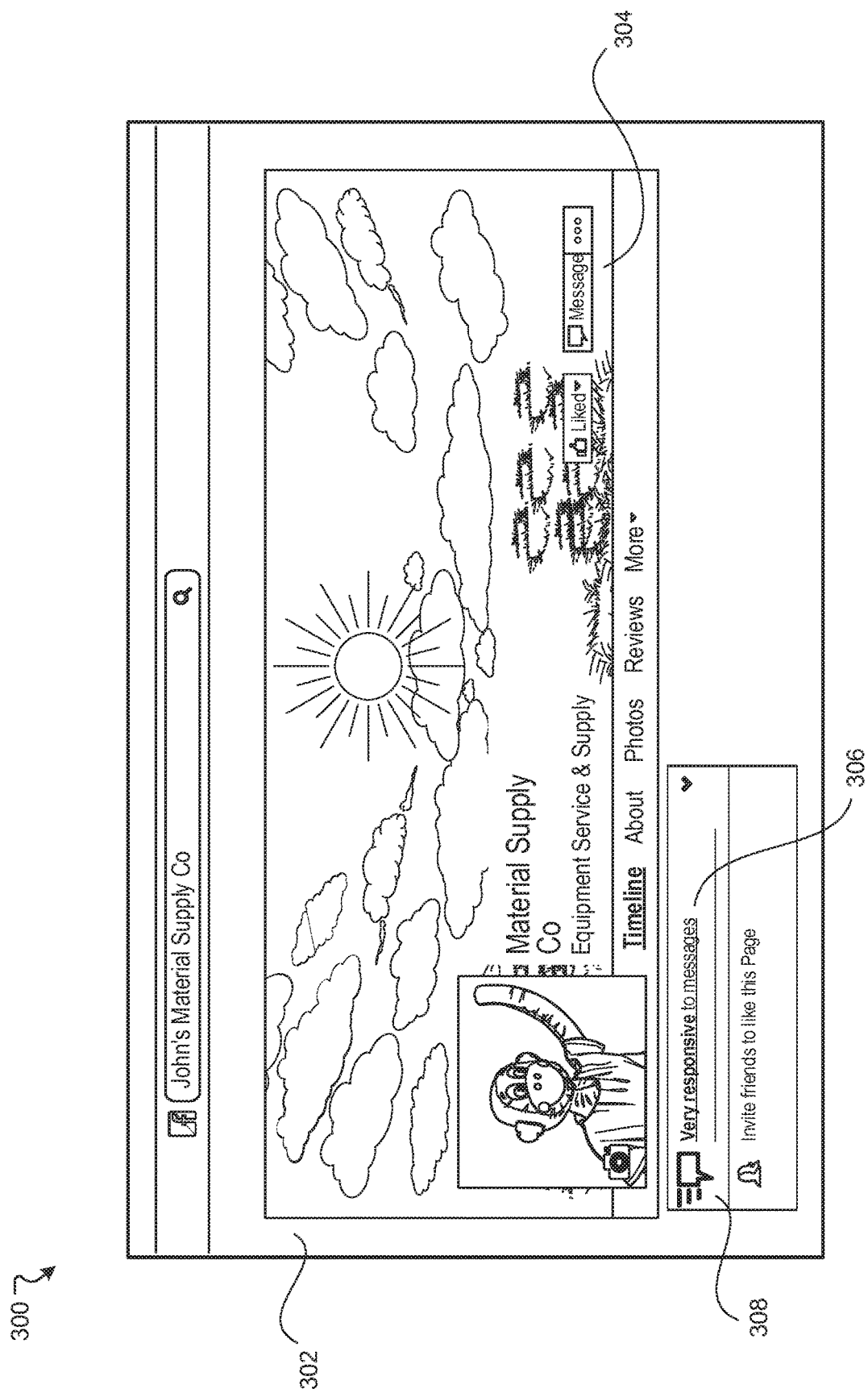
FIG. 3 illustrates an example diagram of a page, according to an embodiment of the present disclosure.

FIG. 3 illustrates an example diagram 300 of a page 302, according to an embodiment of the present disclosure. The page 302 may be presented on a display screen of a computing device. Further, the page 302 may be provided through an application (e.g., a social networking application) running on the computing device. The user operating the computing device can interact with the page 302 to access various information, such as hours of operation, menus, lists of goods and/or services offered, photos, reviews, to name some examples. The user can also select an option 304 to send messages to administrators of the page 302. In some embodiments, when the option 304 is selected, a messaging interface is presented to the user through which the user can communicate messages with an administrator of the page 302. In the example of FIG. 3, information 306 describing the page's responsiveness to messages is shown. In this example, the information 306 indicates that the page is categorized as being "very responsive" to messages. As mentioned, in some embodiments, a page can be awarded one or more badges to signify that the page satisfies one or more responsiveness metrics. In FIG. 3, the page includes a badge 308 signifying that the page is "very responsive" to messages.

Figure 4:
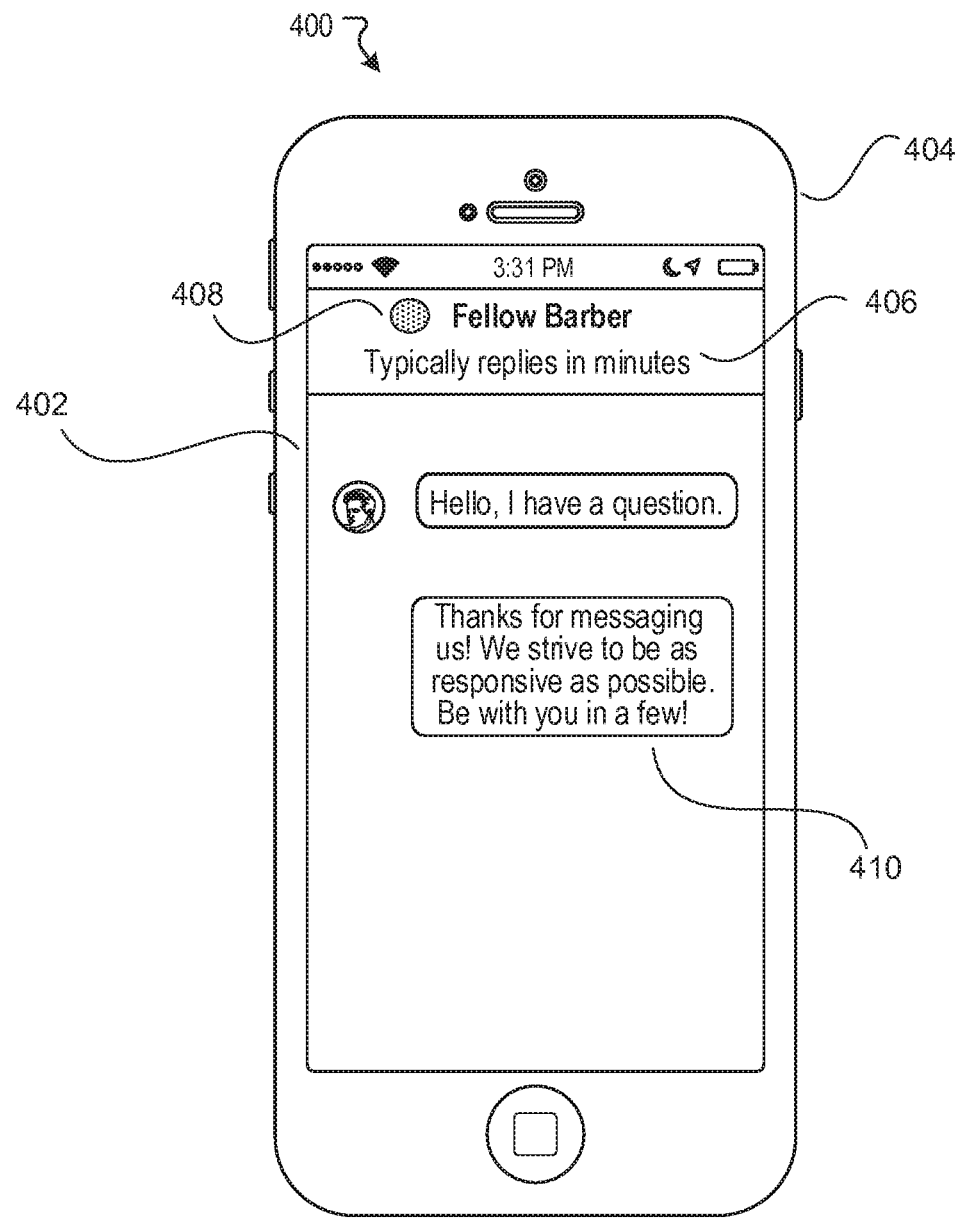
FIG. 4 illustrates an example diagram of a page messaging interface, according to an embodiment of the present disclosure.

FIG. 4 illustrates an example diagram 400 of a page messaging interface 402, according to an embodiment of the present disclosure. The interface 402 may be presented on a display screen of a computing device 404. Further, the interface 402 may be provided through an application (e.g., a social networking application) running on the computing device 404. In this example, the interface 402 is being used to communicate with an administrator of the page "Fellow Barber". Messages sent to, and received from, the administrator can be presented in the interface 402 in chronological order. In some embodiments, the interface 402 indicates an estimated response time 406. Depending on the implementation, this estimated response time may be specified by an administrator of the page or may be set based on the page's determined response time. In some embodiments, the interface 402 also indicates whether an administrator of the page is "online" or is actively reviewing and/or responding to messages. In the example of FIG. 4, this indication is provided in the form of a green circle or dot 408. The interface 402 also includes an instant reply 410 that automatically sent in response to the user's message.

Figure 5:
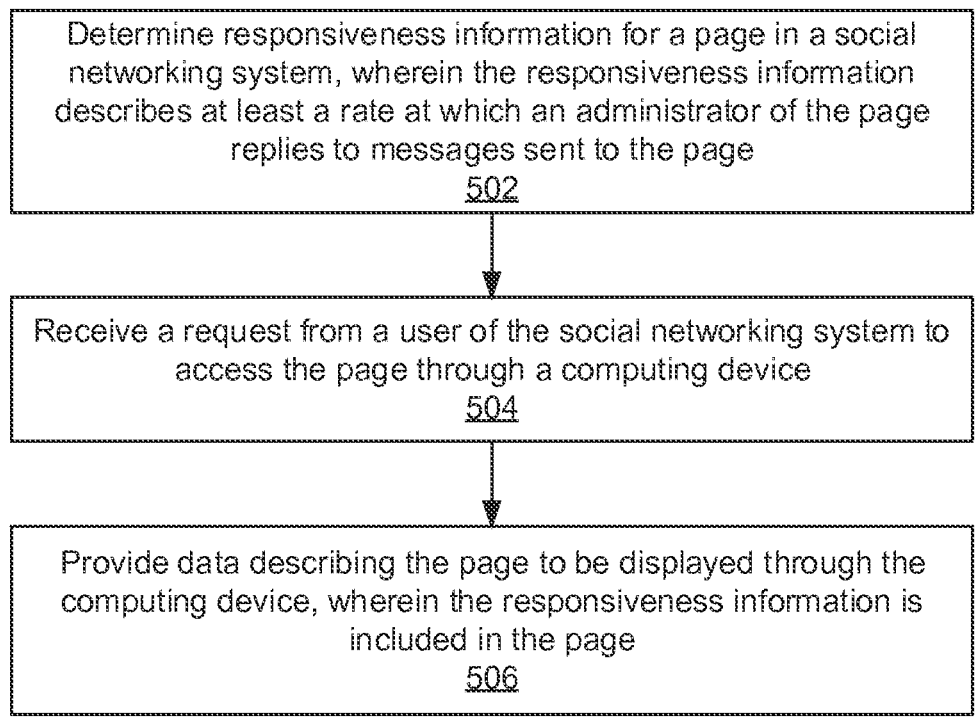
FIG. 5 illustrates an example process for providing page responsiveness information, according to various embodiments of the present disclosure.

FIG. 5 illustrates an example process for providing page responsiveness metrics, according to various embodiments of the present disclosure. It should be appreciated that there can be additional, fewer, or alternative steps performed in similar or alternative orders, or in parallel, within the scope of the various embodiments discussed herein unless otherwise stated. At block 502, responsiveness information for a page in a social networking system can be determined. The responsiveness information can describe at least a rate at which an administrator of the page replies to messages sent to the page. At block 504, a request can be received from a user of the social networking system to access the page through a computing device. At block 506, data describing the page can be provided to be displayed through the computing device. The responsiveness information is included in the page.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
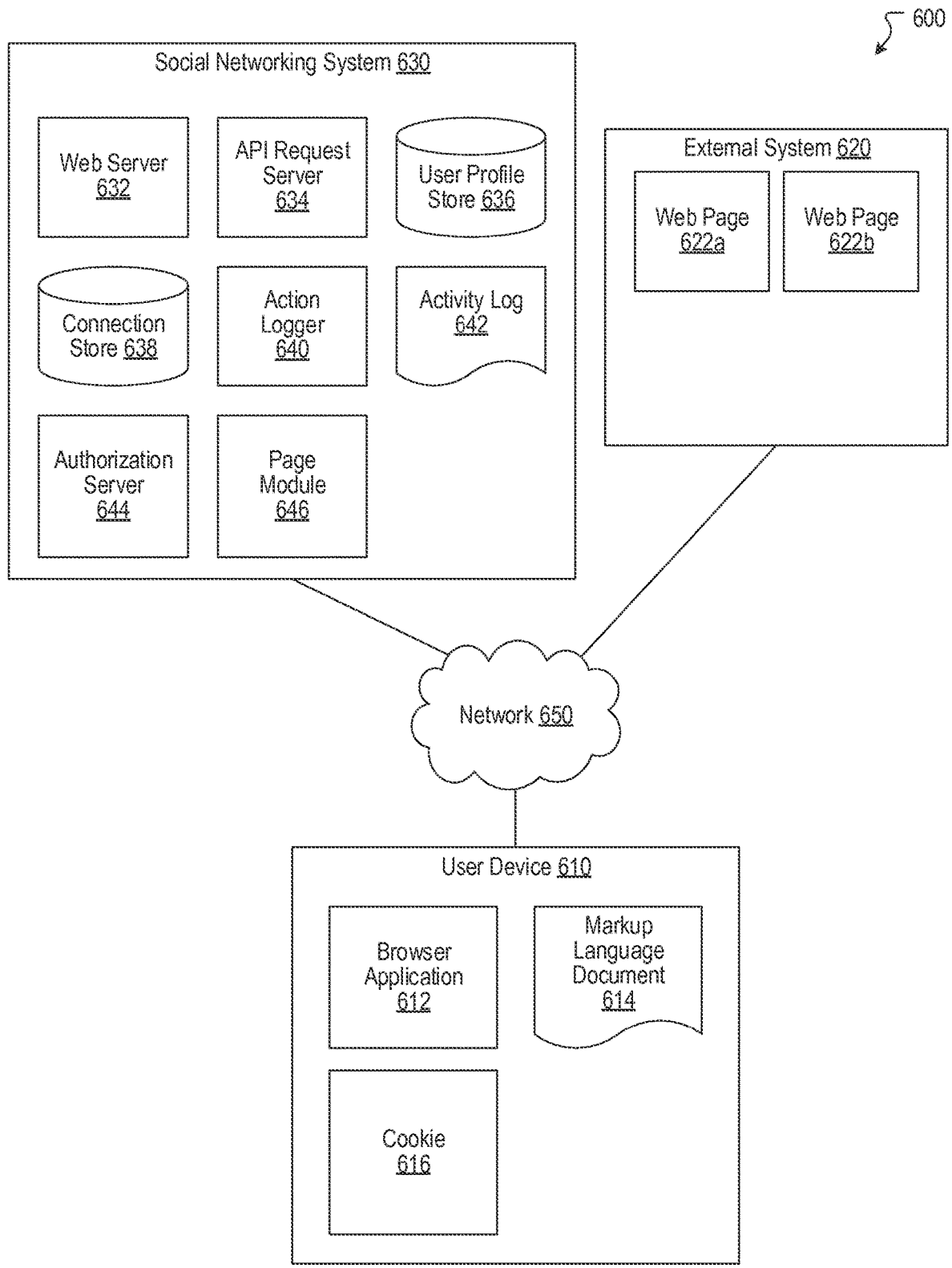
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a page module 646. The page module 646 can, for example, be implemented as the page module 102 of FIG. 1. As discussed previously, it should be appreciated that there can be many variations or other possibilities.

Hardware Implementation

Figure 7:
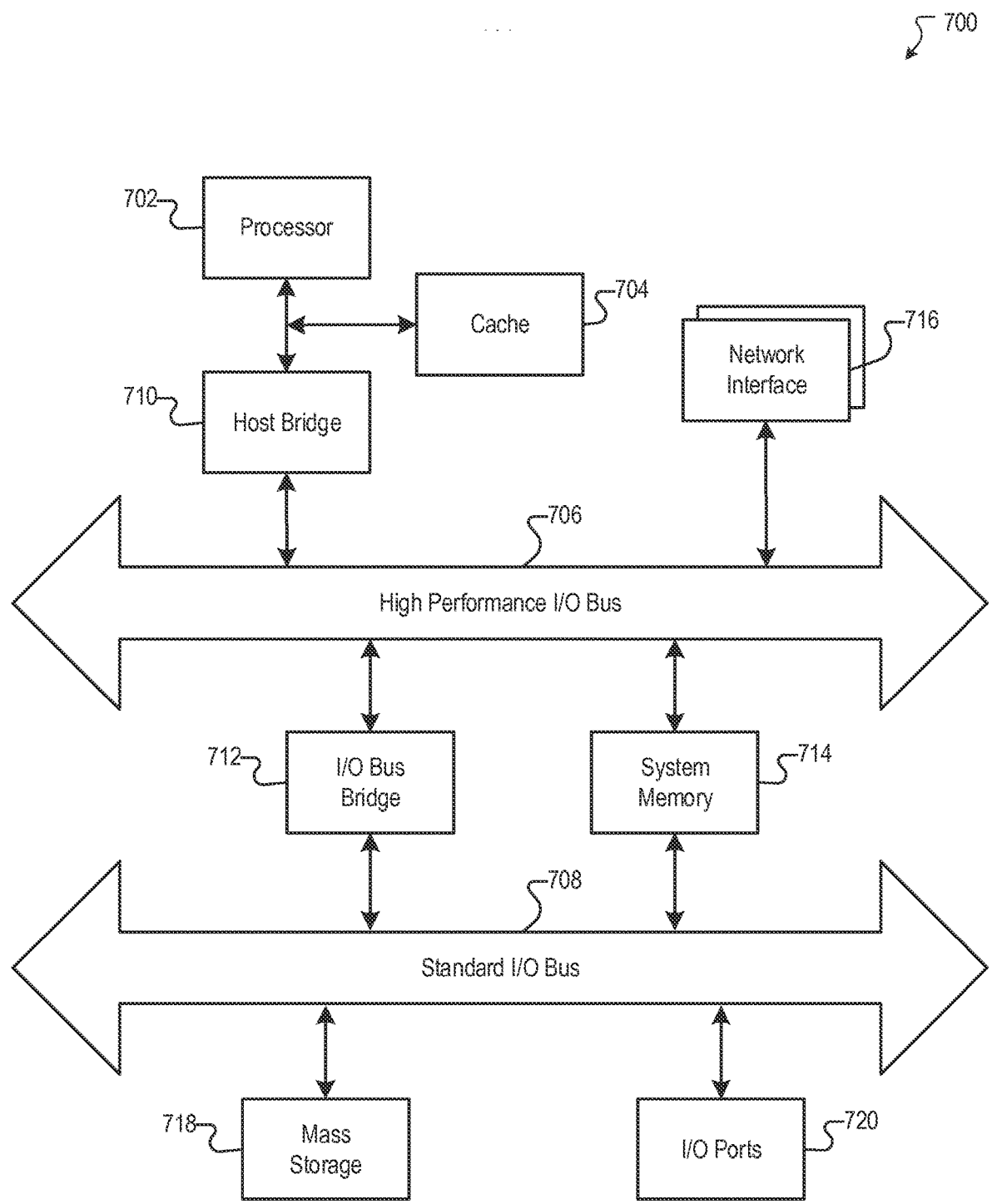
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, responsiveness information for a page,
       wherein the responsiveness information describes at least a rate at which an administrator of the page responds to messages sent to the page,
          wherein the messages sent to the page while the page was set to an away mode are excluded from determination of the responsiveness information;
    classifying, by the computing system, the page into a responsiveness category based at least in part on a response likelihood and a response time determined for the page,
       wherein the response likelihood for the page over a period of time satisfies a threshold response likelihood, and
       wherein the responsiveness category is associated with a level of responsiveness from a plurality of levels of responsiveness;
    receiving, by the computing system, a request from a user to access the page through a graphical user interface on a computing device; and
    providing, by the computing system, a visual badge and an online status of the administrator of the page, presentable through the graphical user interface on the computing device, wherein the visual badge is associated with the responsiveness category.

2. The computer-implemented method of claim 1, wherein the determining the responsiveness information further comprises:
    determining, by the computing system, the response likelihood for the page, the response likelihood measuring a percentage of messages sent to the page over a period of time received a response from the administrator within the period of time.

3. The computer-implemented method of claim 1, wherein the determining the responsiveness information further comprises:
    determining, by the computing system, a median response time taken by the administrator to respond to messages sent to the page over a period of time.

4. The computer-implemented method of claim 1, wherein the determining the responsiveness information further comprises:
    determining, by the computing system, an average response time taken by the administrator to respond to messages sent to the page over a period of time.

5. The computer-implemented method of claim 1, wherein the classifying the page into the responsiveness category further comprises:
    determining, by the computing system, that the response time for the page over the period of time satisfies a threshold response time.

6. The computer-implemented method of claim 1, the method further comprising:
    assigning, by the computing system, the visual badge to the page that corresponds to the responsiveness category.

7. The computer-implemented method of claim 6, wherein the visual badge is displayed in the page.

8. The computer-implemented method of claim 6, wherein the visual badge is displayed in a messaging interface through which messages are sent to the page.

9. A system comprising:
at least one processor; and
a memory storing instructions that, when executed by the at least one processor, cause the system to perform:
determining responsiveness information for a page,
wherein the responsiveness information describes at least a rate at which an administrator of the page responds to messages sent to the page,
wherein the messages sent to the page while the page was set to an away mode are excluded from determination of the responsiveness information;
classifying the page into a responsiveness category based at least in part on a response likelihood and a response time determined for the page,
wherein the response likelihood for the page over a period of time satisfies a threshold response likelihood, and
wherein the responsiveness category is associated with a level of responsiveness from a plurality of levels of responsiveness;
receiving a request from a user to access the page through a graphical user interface on a computing device; and
providing a visual badge and an online status of the administrator of the page, presentable through the graphical user interface on the computing device, wherein the visual badge is associated with the responsiveness category.

10. The system of claim 9, wherein the determining the responsiveness information further causes the system to perform:
determining the response likelihood for the page, the response likelihood measuring a percentage of messages sent to the page over a period of time received a response from the administrator within that same period of time.

11. The system of claim 9, wherein the determining the responsiveness information further causes the system to perform:
determining a median response time taken by the administrator to respond to messages sent to the page over a period of time.

12. The system of claim 9, wherein the determining the responsiveness information further causes the system to perform:
determining an average response time taken by the administrator to respond to messages sent to the page over a period of time.

13. A non-transitory computer-readable storage medium including instructions that, when executed by at least one processor of a computing system, cause the computing system to perform a method comprising:
determining responsiveness information for a page,
wherein the responsiveness information describes at least a rate at which an administrator of the page responds to messages sent to the page,
wherein the messages sent to the page while the page was set to an away mode are excluded from determination of the responsiveness information;
classifying the page into a responsiveness category based at least in part on a response likelihood and a response time determined for the page,
wherein the response likelihood for the page over a period of time satisfies a threshold response likelihood, and
wherein the responsiveness category is associated with a level of responsiveness from a plurality of levels of responsiveness;
receiving a request from a user to access the page through a graphical user interface on a computing device; and
providing a visual badge and an online status of the administrator of the page, presentable through the graphical user interface on the computing device, wherein the visual badge is associated with the responsiveness category.

14. The non-transitory computer-readable storage medium of claim 13, wherein the determining the responsiveness information further causes the computing system to perform:
determining the response likelihood for the page, the response likelihood measuring a percentage of messages sent to the page over a period of time received a response from the administrator within that same period of time.

15. The non-transitory computer-readable storage medium of claim 13, wherein the determining the responsiveness information further causes the computing system to perform:
determining a median response time taken by the administrator to respond to messages sent to the page over a period of time.

16. The non-transitory computer-readable storage medium of claim 13, wherein the determining the responsiveness information further causes the computing system to perform:
determining an average response time taken by the administrator to respond to messages sent to the page over a period of time.

17. The system of claim 9, wherein the classifying the page into the responsiveness category further comprises:
determining that the response time for the page over the period of time satisfies a threshold response time.

18. The non-transitory computer-readable storage medium of claim 13, wherein the classifying the page into the responsiveness category further comprises:
determining that the response time for the page over the period of time satisfies a threshold response time.

* * * * *